US012612320B2

(12) United States Patent
Höfken et al.

(10) Patent No.: US 12,612,320 B2
(45) Date of Patent: Apr. 28, 2026

(54) WASTEWATER PURIFICATION APPARATUS AND PROCESS FOR PURIFYING WASTEWATER

(71) Applicant: INVENT UMWELT—UND VERFAHRENSTECHNIK AG, Erlangen (DE)

(72) Inventors: Marcus Höfken, Erlangen (DE); Peter Huber, Ursensollen (DE); Marcel Huijboom, The Hague (NL)

(73) Assignee: INVENT UMWELT- UND VERFAHRENSTECHNIK AG, Erlangen (DE)

( * ) Notice: Subject to any disclaimer, the term of this patent is extended or adjusted under 35 U.S.C. 154(b) by 921 days.

(21) Appl. No.: 17/608,588

(22) PCT Filed: Mar. 16, 2020

(86) PCT No.: PCT/EP2020/057110
§ 371 (c)(1),
(2) Date: Nov. 3, 2021

(87) PCT Pub. No.: WO2020/224838
PCT Pub. Date: Nov. 12, 2020

(65) Prior Publication Data
US 2022/0234924 A1 Jul. 28, 2022

(30) Foreign Application Priority Data
May 3, 2019 (DE) ..................... 10 2019 111 489.6

(51) Int. Cl.
*C02F 3/12* (2023.01)
*B01F 23/233* (2022.01)
(Continued)

(52) U.S. Cl.
CPC ...... *C02F 3/1263* (2013.01); *B01F 23/23311* (2022.01); *B01F 23/23314* (2022.01);
(Continued)

(58) Field of Classification Search
None
See application file for complete search history.

(56) References Cited

U.S. PATENT DOCUMENTS 10,130,921 B2 * 11/2018 Hoefken ............. B01F 27/0725
2012/0267305 A1 10/2012 Hoefken

FOREIGN PATENT DOCUMENTS

CN 105344283 A * 2/2016
DE 9106639 U1 9/1991
(Continued)

OTHER PUBLICATIONS

JP2006255514A Description Translation (Year: 2006).*
(Continued)

*Primary Examiner* — Richard C Gurtowski
(74) *Attorney, Agent, or Firm* — HAUPTMAN HAM, LLP

(57) ABSTRACT

A wastewater purification apparatus includes an elongate tank, which has an inflow for feeding wastewater, a first vertical agitator with a first hyperboloid agitator body mounted on a vertical first agitator shaft and provided in a first treatment portion downstream of the inflow on the first narrow side, a second vertical agitator with a second hyperboloid agitator body mounted on a vertical second agitator shaft and provided in a second treatment portion downstream of the first vertical agitator, an aeration device with a fan for aerating wastewater received in the tank, a first drive device for rotating the first hyperboloid agitator body in a first rotation direction, a second drive device for rotating the second hyperboloid agitator body in a second rotation
(Continued)

Figure 1:
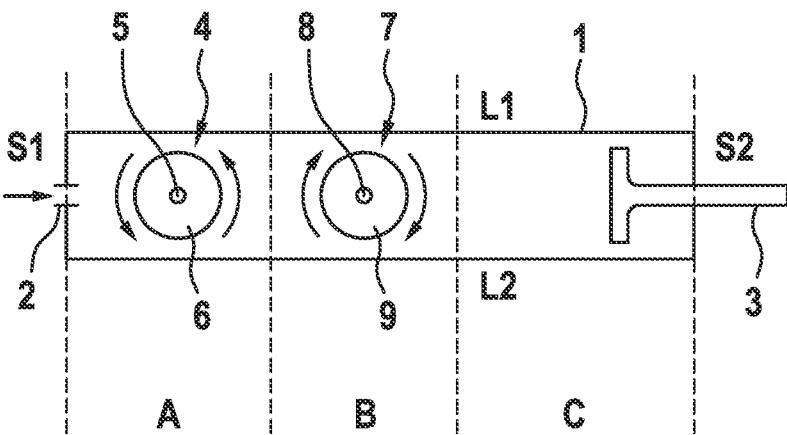

direction opposite the first rotation direction, and a decanter for discharging purified wastewater in a third treatment portion on a second narrow side opposite the first narrow side.

15 Claims, 9 Drawing Sheets

(51) Int. Cl.

| | |
|---|---|
| *B01F 27/81* | (2022.01) |
| *B01F 27/85* | (2022.01) |
| *C02F 3/20* | (2023.01) |
| *B01F 101/00* | (2022.01) |

(52) U.S. Cl.

CPC ............ *B01F 27/81* (2022.01); *B01F 27/851* (2022.01); *C02F 3/1284* (2013.01); *C02F 3/205* (2013.01); *B01F 2101/305* (2022.01); *C02F 2301/08* (2013.01)

(56) References Cited

FOREIGN PATENT DOCUMENTS

| | | | | |
|---|---|---|---|---|
| DE | 102009045032 | A1 * | 3/2011 | ............ C02F 3/085 |
| EP | 0687497 | A1 * | 12/1995 | |
| EP | 1132348 | A1 * | 9/2001 | ............ C02F 3/02 |
| EP | 1132348 | B1 | 4/2010 | |
| JP | 2006255514 | A * | 9/2006 | .......... B01F 7/00541 |
| KR | 200431223 | Y1 * | 11/2006 | |
| KR | 101024842 | B1 * | 3/2011 | |
| KR | 101097197 | B1 * | 12/2011 | |
| KR | 101391903 | B1 * | 5/2014 | |
| KR | 101554224 | B1 * | 9/2015 | |
| KR | 20160137453 | A * | 11/2016 | |
| KR | 101876789 | B1 * | 7/2018 | |
| WO | WO-2012098466 | A1 * | 7/2012 | .......... B01F 3/04517 |

OTHER PUBLICATIONS

JP-2006255514-A translation (Year: 2006).*
KR-200431223-Y1 translation (Year: 2006).*
KR-101391903-B1 translation (Year: 2014).*
KR-101554224-B1 translation (Year: 2015).*
KR-101876789-B1 translation (Year: 2018).*
KR-101097197-B1 Translation (Year: 2011).*
EP-0687497-A1 Translation (Year: 1995).*
DE-102009045032-A1 Translation (Year: 2011).*
KR101024842B1 Translation (Year: 2011).*
KR-20160137453-A Translation (Year: 2016).*
Invent. "iSBR /iGSR system". Sep. 15, 2010 https://invent-uv.de/produkte-services/systemloesungen/isbr-igsr-system/. Accessed Mar. 26, 2025 (Year: 2010).*
PCT/ISA/210, "International Search Report for International Application No. PCT/EP2020/057110," Jun. 23, 2020.

* cited by examiner

1

WASTEWATER PURIFICATION APPARATUS AND PROCESS FOR PURIFYING WASTEWATER

RELATED APPLICATIONS

The present application is National Phase of International Application No. PCT/EP2020/057110 filed Mar. 16, 2020, and claims priority from German Application No. DE 10 2019 111 489.6 filed May 3, 2019, the disclosure of which is hereby incorporated by reference herein in its entirety.

The invention relates to a wastewater purification apparatus and to a process for purifying wastewater, in particular what is known as an SBR process.

Document EP 1 132 348 B1 discloses a wastewater purification apparatus and a wastewater purification process for biological wastewater treatment. The wastewater purification apparatus comprises an elongate tank which is divided by means of partition walls into a plurality of treatment portions. A purification of the wastewater takes place in the treatment portions in accordance with that is known as the "Sequencing Batch Reactor" process (SBR process). To this end, the wastewater is brought into contact, in a first treatment portion, with an activated sludge. The suspension formed from the wastewater and the activated sludge is then aerated, in particular in a second treatment portion. Lastly, the suspension is neither aerated nor moved in a third treatment portion. The treated water is removed as supernatant by means of a decanter. The SBR process is usually performed in batches.

In the wastewater purification apparatus known from EP 1 132 348 B1 the movable partition walls are made of a waterproof, flexible film. Such a film is not particularly durable. In order to transfer the wastewater from one treatment portion into the next, pumps and lines are necessary. The treatment efficiency of the known wastewater purification apparatus is not too great.

The object of the invention is to overcome the disadvantages according to the prior art. In particular, a wastewater purification apparatus and a process are described which enable a purification of wastewater with an improved efficiency. The wastewater purification apparatus and the process should in particular also enable a continuous purification of wastewater.

This object is achieved by the features of claims 1 and 8. Expedient embodiments of the invention will become clear from the features of the dependent claims.

In accordance with the invention a wastewater purification apparatus for purifying wastewater is proposed, comprising:

an elongate tank, which, on its first narrow side, has an inflow for feeding wastewater, a first vertical agitator with a first hyperboloid agitator body attached to a vertical first agitator shaft, wherein the first vertical agitator is provided in a first treatment portion downstream of the inflow on the first narrow side, a second vertical agitator with a second hyperboloid agitator body attached to a vertical second agitator shaft, wherein the second vertical agitator is provided in a second treatment portion downstream of the first vertical agitator, an aeration device with a fan for aerating wastewater received in the tank, a first drive device for rotating the first hyperboloid agitator body in a first rotation direction,

a second drive device for rotating the second hyperboloid agitator body in a second rotation direction, which is opposite the first rotation direction, and a decanter, which is provided for discharging purified wastewater in a third treatment portion on a second narrow side, which is opposite the first narrow side.

In the sense of the present invention the wastewater flows from the inflow on the first narrow side to the decanter on the second narrow side. Based on this flow direction, the first vertical agitator is arranged downstream of the inflow, and the second vertical agitator is arranged downstream of the first vertical agitator. Each of the vertical agitators has a hyperboloid agitator body as agitator body. As a hyperboloid agitator body rotates, a flow forms which is directed along the agitator shaft in the direction of the hyperboloid agitator body. The flow deflects at the surface of the hyperboloid agitator body in a substantially horizontal direction. At a certain distance from the peripheral edge of the hyperboloid agitator body, the flow then deflects again in a vertical direction towards the surface of the wastewater. The flow then runs approximately parallel to the surface and then deflects again in the direction of the agitator shaft. A circulating flow thus forms as a result of the effect of the vertical agitator. The flow additionally rotates axially about the agitator shaft in accordance with the rotation direction of the agitator shaft. Since the first vertical agitator and the second vertical agitator are operated with a different rotation direction, a zone forms between the successive vertical agitators, in which zone the flow is directed substantially vertically upwardly in the direction of the surface of the wastewater. There, the flow divides and passes back into the respective treatment portions. Due to the use of two vertical agitators rotating in opposite directions, as proposed in accordance with the invention, it is thus possible to create treatment portions in which wastewater may be subjected to different treatment steps, without having to provide partition walls in an elongate tank. For example, the wastewater may be brought into contact with a high concentration of activated sludge in the first treatment portion. In the second treatment portion the wastewater may be brought into contact with a lower concentration of activated sludge and may also be aerated, preferably simultaneously. The aeration may be varied in the treatment portions. The intensity of the aeration and the rotary speed of the hyperboloid agitator bodies may also be varied in the treatment portions.

The proposed wastewater purification apparatus enables an efficient purification of wastewater. It also enables a continuous or quasi continuous process sequence. Pumps and lines for transferring the treated wastewater from one treatment portion into the next are not necessary. A transfer of the treated wastewater from one treatment portion into the next may be controlled by a suitable controller of the rotary speed of the vertical agitators, of the amount of wastewater fed through the inflow, and/or of the amount of wastewater removed by means of the decanter.

In accordance with an advantageous embodiment, first transport ribs provided on an upper side of the hyperboloid agitator body have a first curvature, and transport ribs provided on a further upper side of the second hyperboloid agitator body have a second curvature, which is opposite the first curvature. Due to the proposed embodiment of the transport ribs, the stirring efficiency and in particular the formation of the circulating flow may be improved. The ribs may also be formed in a straight line. In this case the first transport ribs have a first angle relative to the radial direction and the second transport ribs have an opposite, second angle relative to the radial direction.

In accordance with a particularly advantageous embodiment, at least one of the hyperboloid agitator bodies is formed as a hollow body and has a central aperture for the passage of air as well as aeration apertures. The agitator shaft may be formed as a hollow shaft for feeding air to the central aperture. Furthermore, the drive device may have a transmission with a hollow transmission shaft, one end of which is connected to the fan and the other end of which is connected to the hollow shaft. In accordance with the proposed embodiment the hyperboloid agitator body is used both for stirring and for aerating the wastewater. A plurality of hyperboloid agitator bodies, or all of them, are expediently formed as hollow bodies for aerating the wastewater.

Of course, it may also be that the aeration device comprises at least one perforated air feed line, which is supported on a base of the tank and which is connected to the fan. Devices which comprise a plurality of perforated air feed lines may also be provided. Devices of this kind are known in general in accordance with the prior art.

In accordance with a further embodiment a plurality of first vertical agitators are provided successively in the flow direction in the first treatment portion and/or a plurality of second vertical agitators are provided successively in the flow direction in the second treatment portion, wherein the hyperboloid agitator bodies of successive agitators are rotated in each case with opposite rotation directions. The proposed embodiment is suitable in particular for long treatment tanks and for the treatment of large amounts of wastewater.

The treatment tank may also be embodied such that a plurality of vertical agitators are arranged in a direction perpendicular to the flow direction. If vertical agitators are arranged adjacently in a direction perpendicular to the flow direction, they are preferably each operated with the same rotation direction.

In accordance with an advantageous embodiment the hyperboloid agitator body is configured as a hollow body. It expediently has a central aperture for feeding air and also air outlet openings. The agitator shaft may be formed as a hollow shaft for feeding air to the central aperture. A drive device may have a transmission with a hollow transmission shaft, one end of which is connected to the fan and the other end of which is connected to the hollow shaft. The wastewater may be efficiently aerated by means of the proposed hyperboloid agitator body. It is in particular not necessary to lay aeration lines on the base of the tank.

In accordance with a further provision of the invention, a process for purifying wastewater, in particular an SBR process, is proposed, comprising the following steps:

providing a wastewater purification apparatus according to the invention, wherein an activated sludge is provided in the first and in the second treatment portion, feeding wastewater through the inflow, stirring a suspension formed from the wastewater and the activated sludge by means of a first vertical agitator in the first treatment portion, wherein the first agitator body rotates at a predefined first rotary speed in the first rotation direction and the suspension is aerated by means of the aeration device, stirring the suspension by means of the second vertical agitator, wherein the second agitator body rotates at a predefined second rotary speed in the second rotation direction and the suspension is aerated by means of the aeration device, leaving the suspension to rest in the third treatment portion, wherein it is neither stirred nor aerated by means of the aeration device, and decanting the supernatant by means of the decanter.

The proposed process enables a particularly efficient purification of wastewater. Due to the proposed opposite rotation directions of the successive agitators, it is possible to subject the wastewater to different conditions in the treatment portions thus formed. For example, in the first treatment portion the wastewater may be brought into contact with a high concentration of activated sludge, whereas in the second treatment portion the wastewater may be brought into contact with an elevated concentration of air. The process may be performed both as a batch process and as a continuous or quasi continuous process.

The first rotary speed is preferably selected to be slower than the second rotary speed. It is thus possible for the wastewater to be brought into contact in the first treatment portion with a high concentration of activated sludge. In particular, an undesirable transport of activated sludge from the first treatment portion into the second treatment portion may be reduced or eliminated.

If a plurality of first vertical agitators are provided in the first treatment portion, the first rotary speeds thereof may also be selected to be different. For example, the first rotary speed may become quicker in the downstream direction. Similarly, if a plurality of second vertical agitators are provided in the second treatment portion, it is also possible for the second rotary speeds to be selected to be different. The second rotary speeds may decrease in the direction of the third treatment portion. This assists the desired separation of the suspension in the third treatment portion into the activated sludge and into treated wastewater.

The first rotary speed is advantageously selected such that a concentration of activated sludge in a base-side, lower half of the suspension is higher than in a surface-side, upper half. The wastewater may thus be brought into contact in the base-side, lower half with a particularly high concentration of activated sludge.

In the first treatment portion there is provided a plurality of first vertical agitators arranged successively in the flow direction and/or in the second treatment portion there is provided a plurality of second vertical agitators arranged successively in the flow direction, wherein the hyperboloid agitator bodies of directly successive vertical agitators are rotated in each case in opposite directions. A predefined holding time of the wastewater in the various treatment portions may thus be ensured.

In accordance with a particularly advantageous embodiment, the wastewater is fed continuously. However, it is also possible for the wastewater to be fed sequentially. In this case the process may be carried out in accordance with the SBR process.

In the SBR process the wastewater is stirred in a plurality of successive steps. It may be aerated simultaneously in one or more steps. However, it is also possible to aerate the wastewater without it being stirred simultaneously.

In a further step the wastewater is stirred merely at low intensity. In this step it is not aerated. The step is used for sedimentation.

In a further step the wastewater is stirred at most at low intensity in the first treatment portion. In this step the wastewater is decanted in the third treatment portion.

In all of the aforementioned steps, wastewater may be fed continuously to the treatment tank through the inflow. The decanting may also be performed continuously.

In order to carry out the SBR process, further steps may be added to the process according to the invention, in which further steps the wastewater is in particular merely stirred, but not aerated.

The suspension advantageously is neither stirred nor aerated by means of the aeration device during the step in which it is left to rest in the second treatment portion. Furthermore, the suspension also may be neither stirred nor aerated by means of the aeration device during the step in which it is left to rest in the first treatment portion. The step of leaving the suspension to rest is thus accelerated. The efficiency of the process may thus be further increased.

Figure 2:
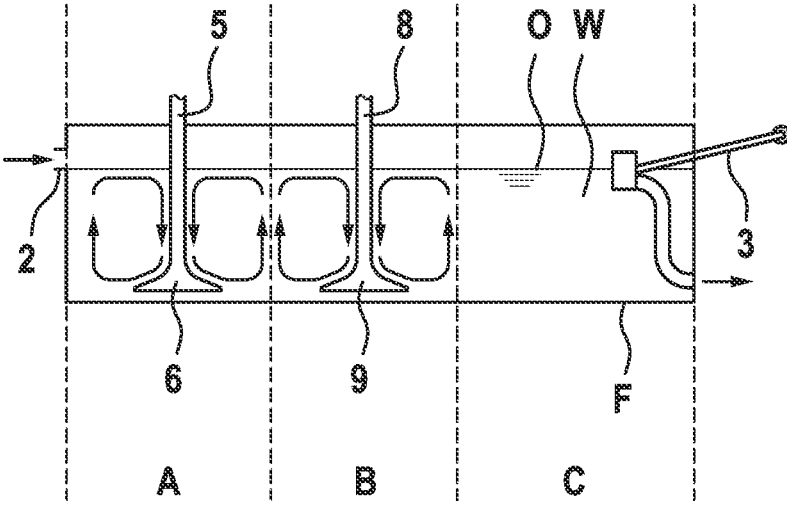
Figure 3:
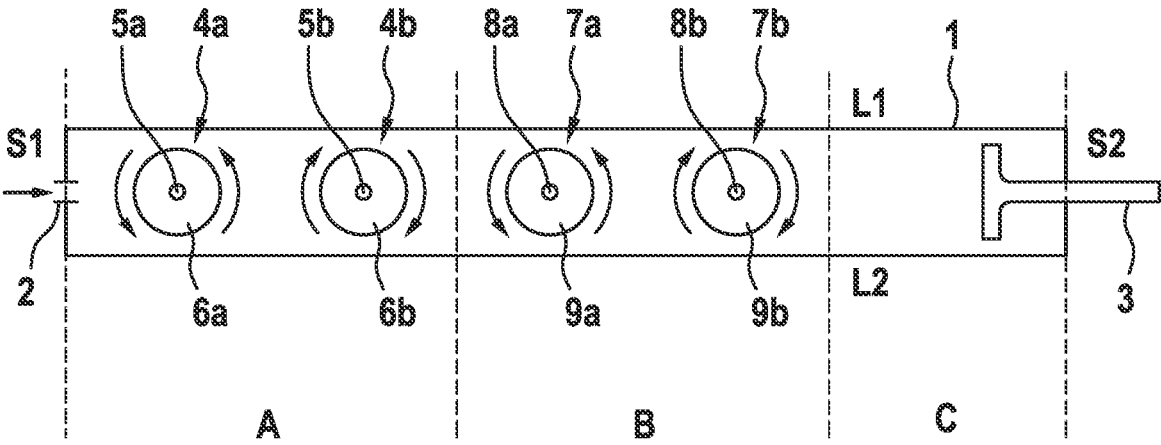
Figure 4:
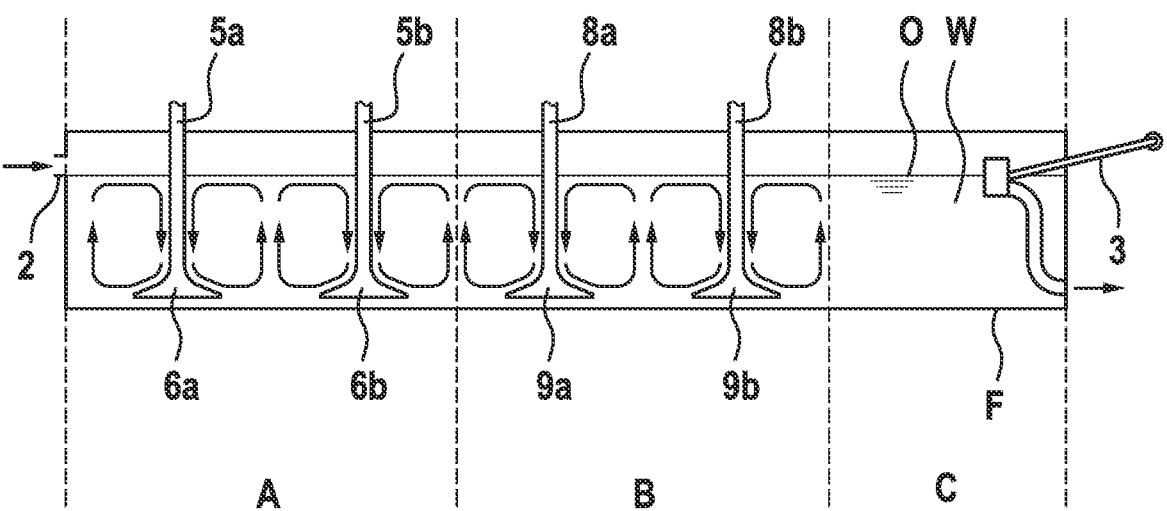
Figure 5:
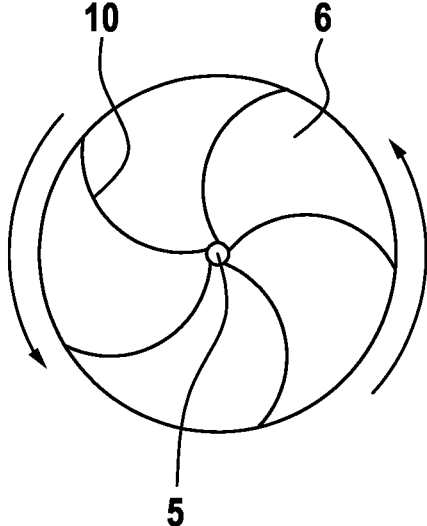
Figure 6:
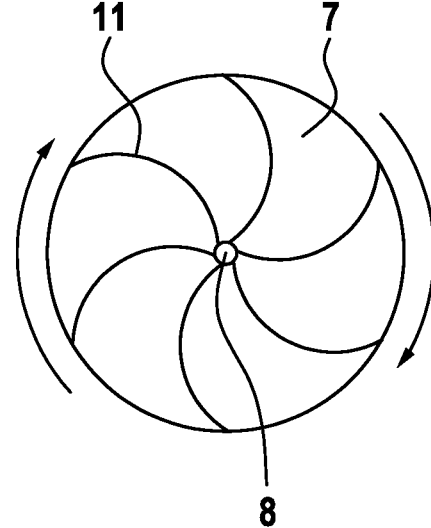
Figure 7:
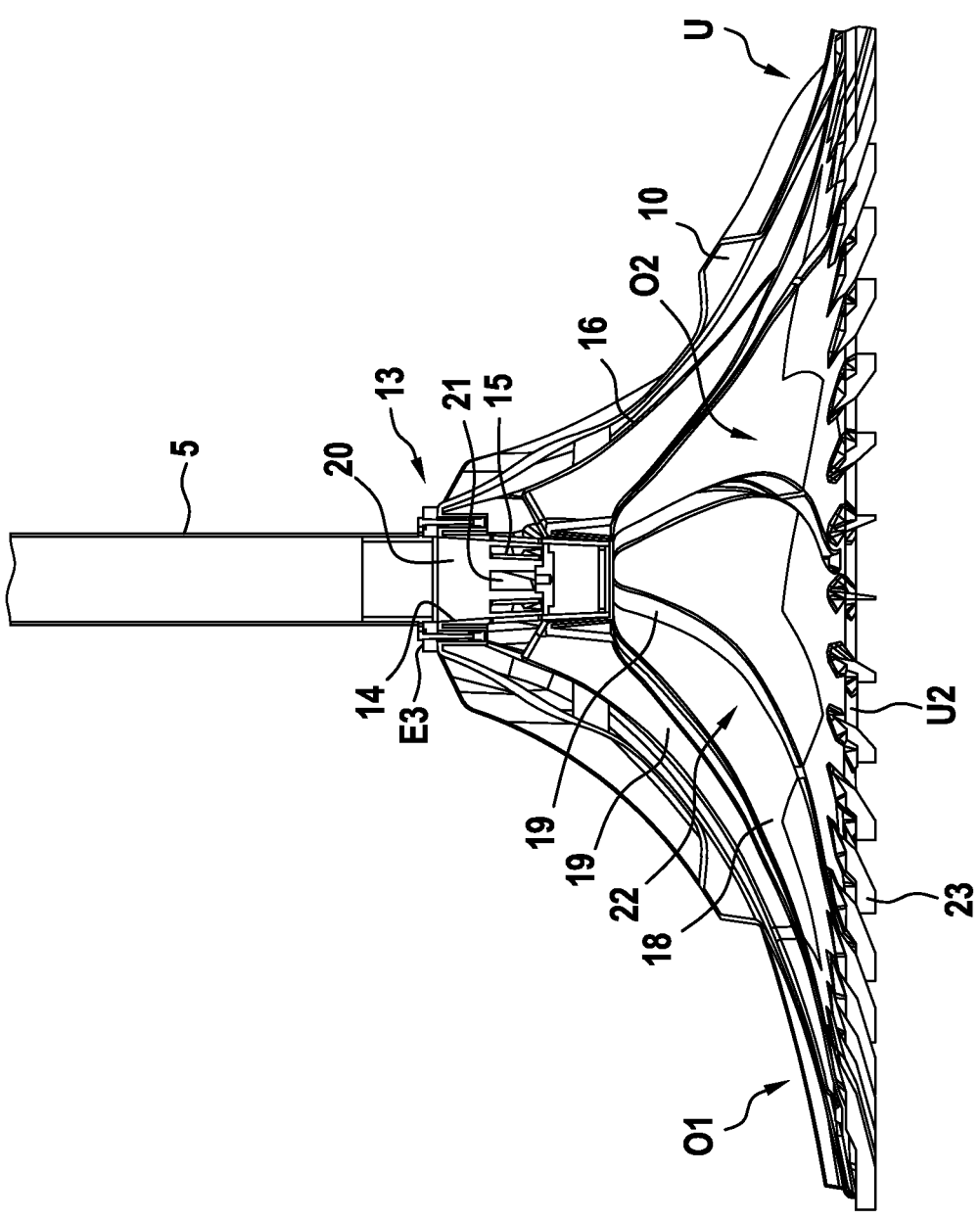
Figure 8:
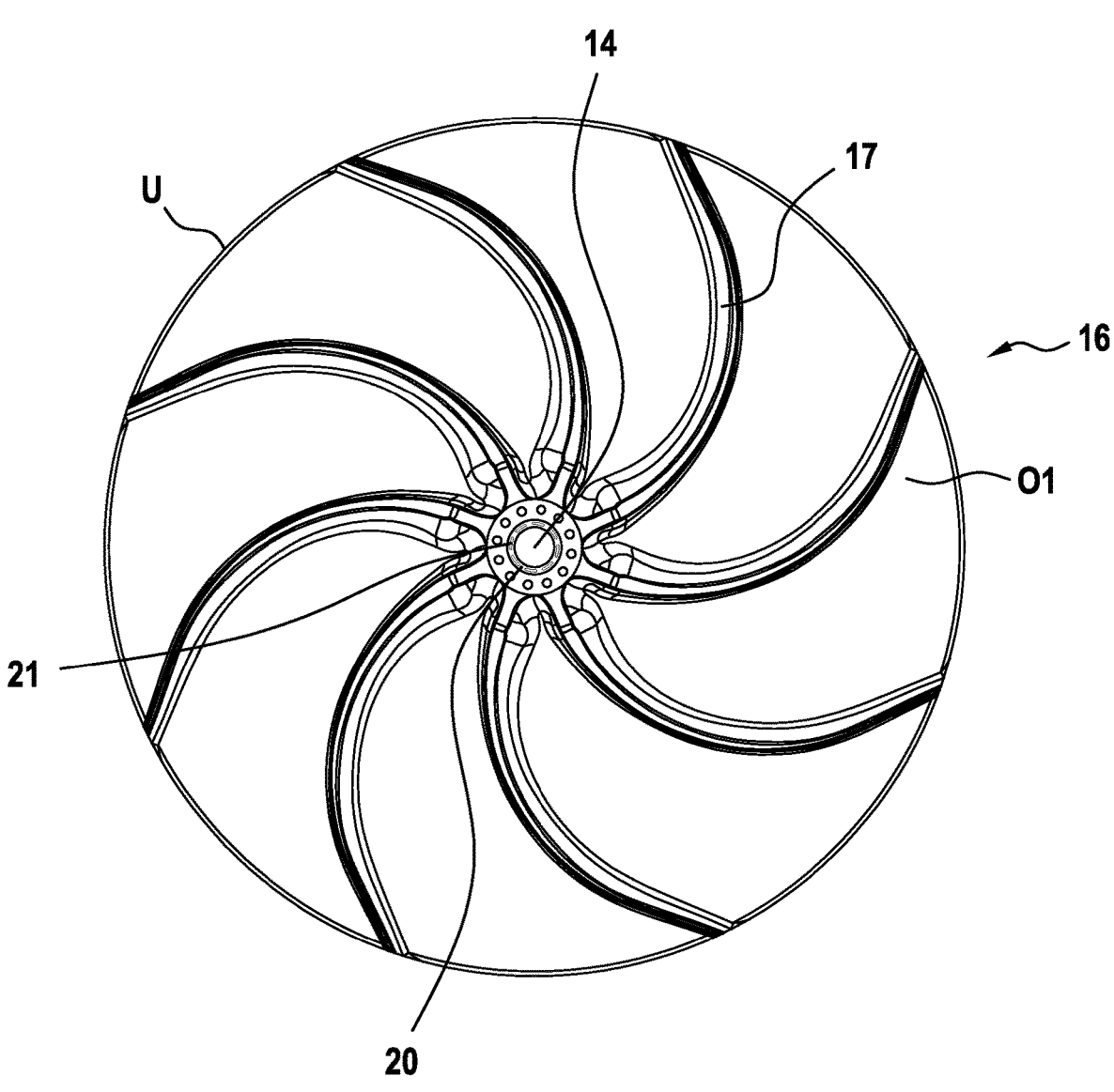
Figure 9:
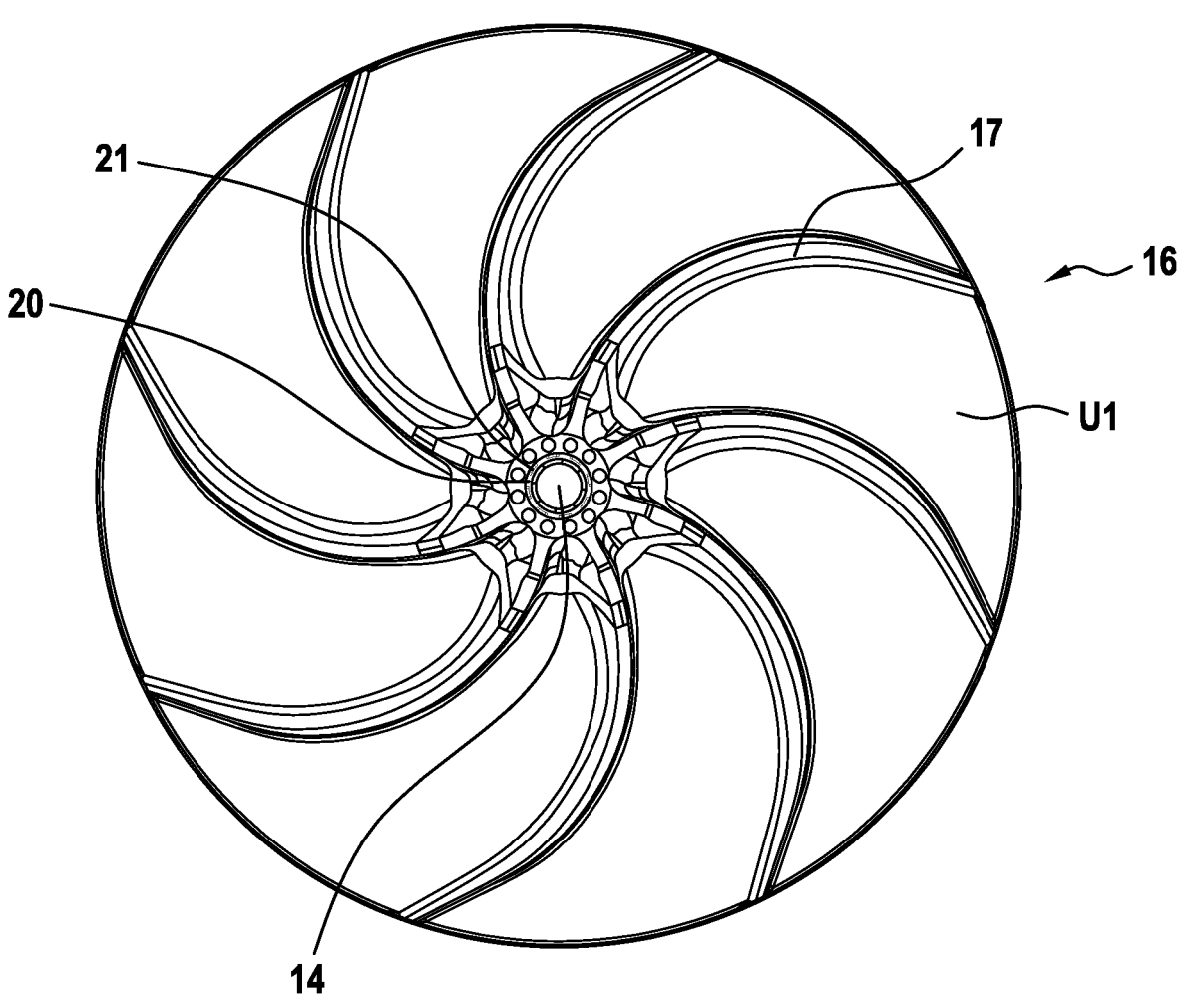
Figure 10:
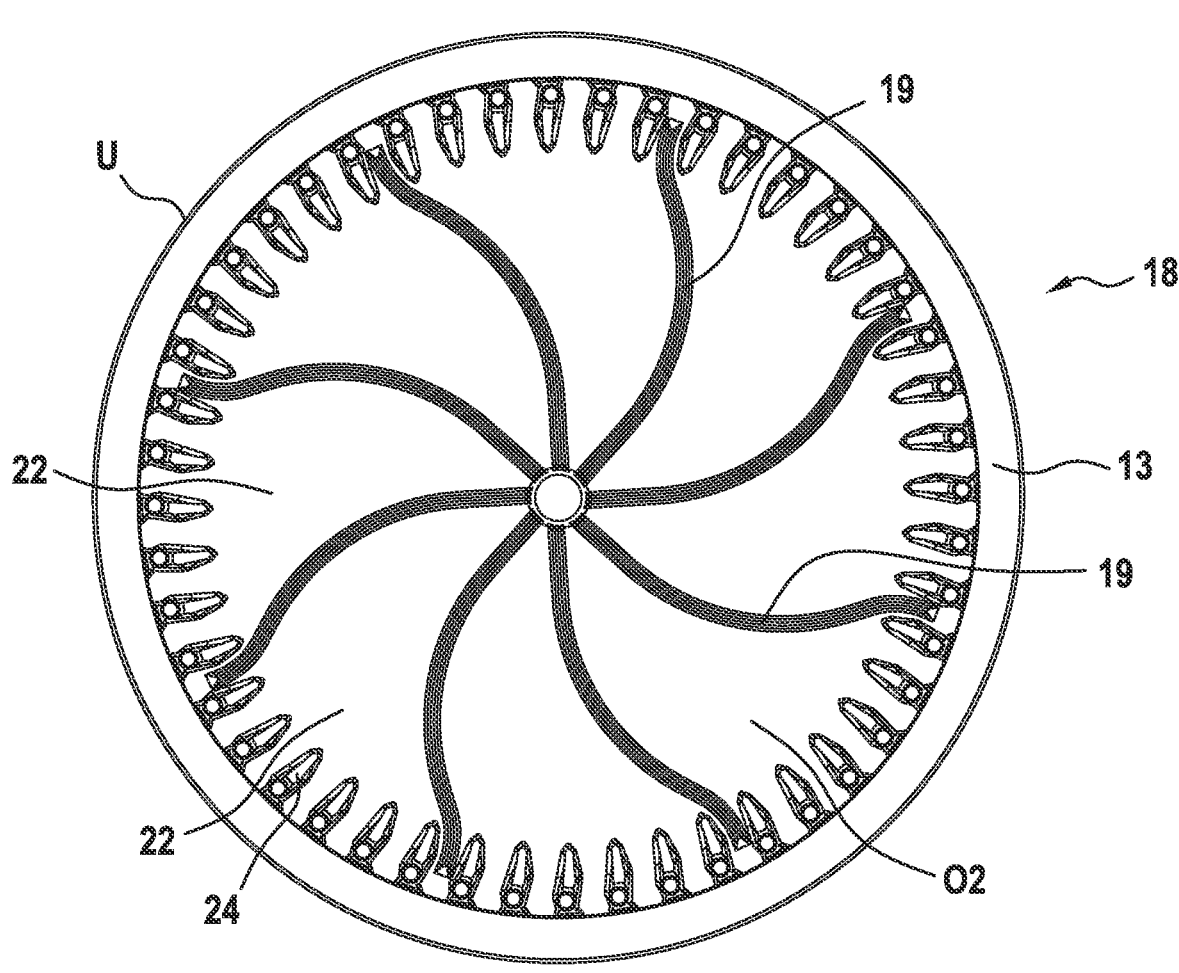
Figure 11:
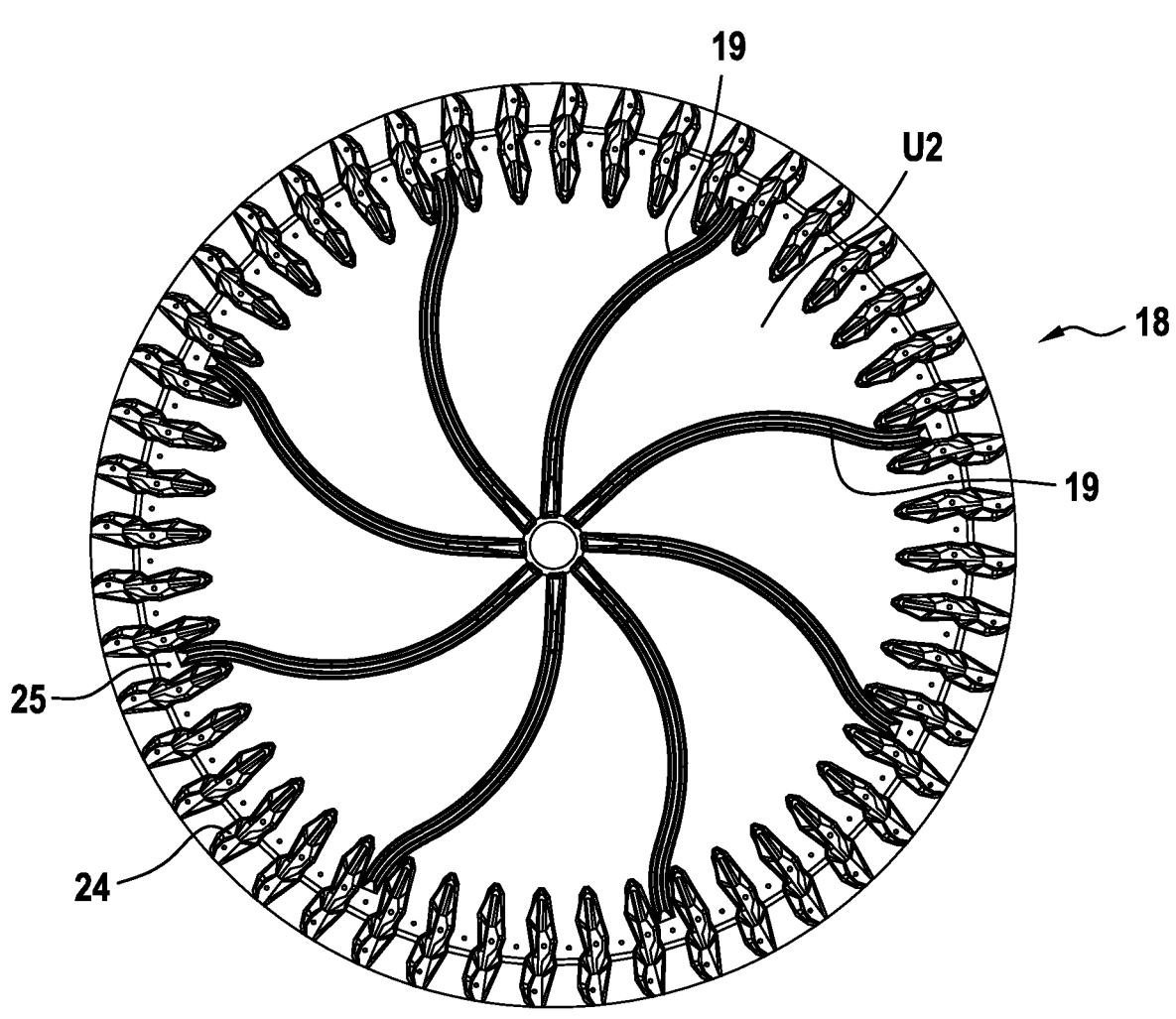
Figure 12:
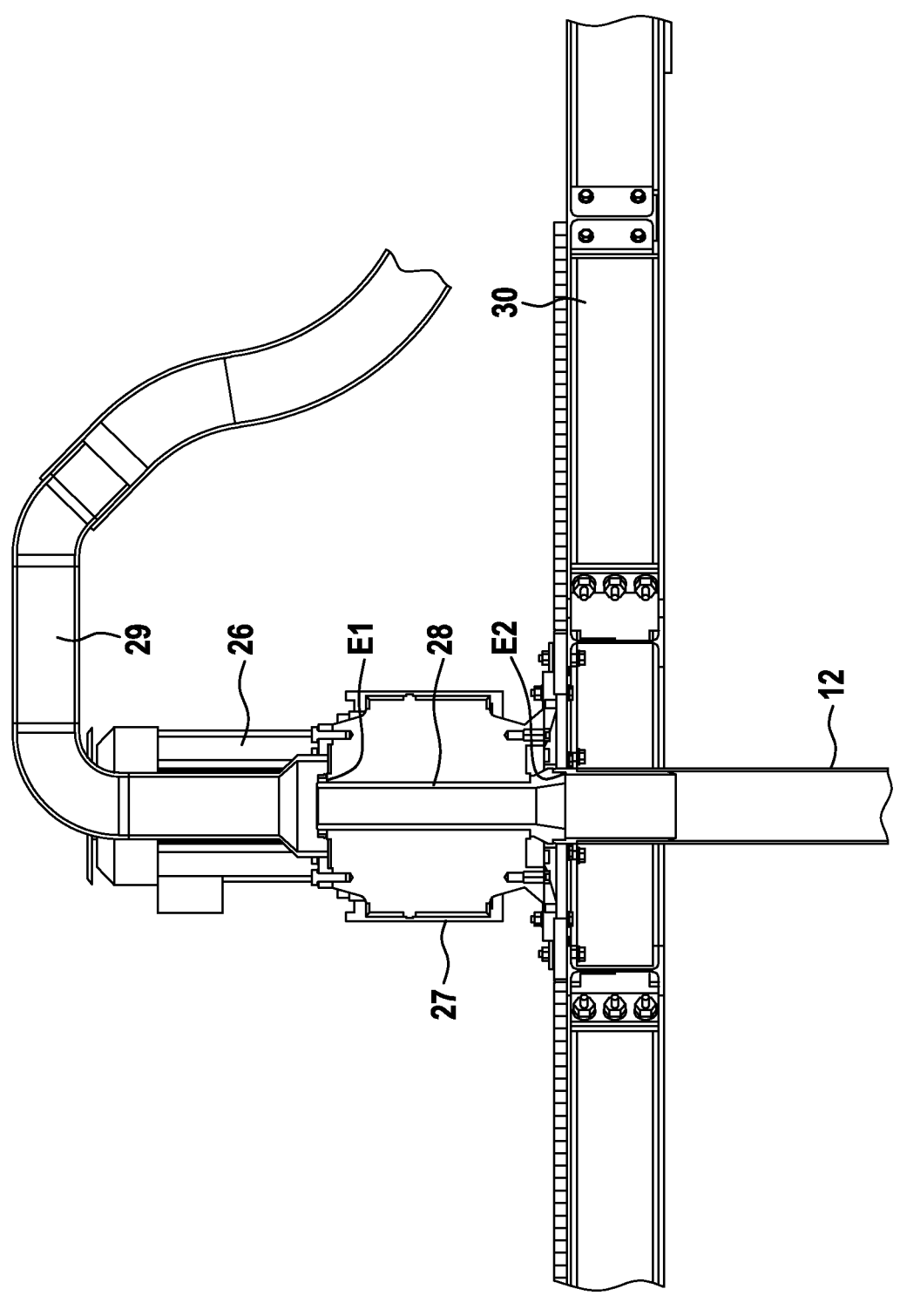

Exemplary embodiments of the invention will be explained in greater detail with reference to the drawings, in which:

FIG. 1 shows a schematic plan view of a first wastewater purification apparatus, FIG. 2 shows a schematic sectional view according to FIG. 1, FIG. 3 shows a schematic plan view of a second wastewater purification apparatus, FIG. 4 shows a sectional view according to FIG. 3, FIG. 5 shows a schematic plan view of a first hyperboloid agitator body, FIG. 6 shows a schematic plan view of a second hyperboloid agitator body, FIG. 7 shows a partially broken-open perspective view of a third hyperboloid agitator body, FIG. 8 shows a plan view of an upper shell, FIG. 9 shows a view from below according to FIG. 8, FIG. 10 shows a plan view of a lower shell, FIG. 11 shows a view from below according to FIG. 10, and FIG. 12 shows a schematic sectional view through a motor and a transmission.

FIGS. 1 and 2 show views of a first wastewater purification apparatus. The first wastewater purification apparatus comprises an elongate tank 1, which has an inflow 2 on its first narrow side S1 for feeding wastewater. On a second narrow side S2, which is opposite the first narrow side S1, there is provided a decanter 3 for discharging purified wastewater. A first long side of the tank 1 is denoted by L1 an opposite, second long side is denoted by L2. Downstream of the inflow, a first vertical agitator 4 is provided, which has a first hyperboloid agitator body 6 on a first agitator shaft 5. Reference sign 7 denotes a second vertical agitator, which has a second hyperboloid agitator body 9 on a second agitator shaft 8.

The first vertical agitator 4 has a first drive device (not shown here), by means of which the first hyperboloid agitator body 6 is rotatable in an anticlockwise direction in plan view. The second vertical agitator 7 is provided with a second drive device (not shown here), by means of which the second hyperboloid agitator body 9 is rotatable in a clockwise direction.

In the case of the second wastewater purification apparatus shown schematically in FIGS. 3 and 4, two first vertical agitators 4a, 4b are provided in succession in a flow direction directed from the inflow 2 to the decanter 3, followed by two second vertical agitators 7a, 7b. The first drive devices (not shown here) of the first vertical agitators 4a, 4b are designed such that the hyperboloid agitator bodies 6a, 6b of the vertical agitators are rotated in opposite directions. Similarly, the second drive devices (not shown here) are designed such that the second hyperboloid agitator bodies 9a, 9b are also rotated in opposite directions. The first hyperboloid agitator body 6b of the first vertical agitator 5b is advantageously rotated oppositely to the second hyperboloid agitator body 9a of the second vertical agitator 7a.

Consequently, in this advantageous embodiment, successive hyperboloid agitator bodies 6a, 6b, 9a, 9b are rotated in each case in opposite directions.

At least one first vertical agitator 4, 4a, 4b is arranged in a first treatment portion A of the tank 1 provided downstream of the inflow 2. At least one second vertical agitator 7, 7a, 7b is arranged in a second treatment portion B provided downstream of the first treatment portion A. There is no vertical agitator arranged here in a third treatment portion C following on downstream from the second treatment portion B. The decanter 3 is situated in said third treatment portion. However, it may also be that at least one vertical agitator is likewise provided in the third treatment portion C.

Aeration devices (not shown here) are provided in the first treatment portion A and in the second treatment portion B. These devices may be perforated feed lines laid on the base F of the tank 1. In accordance with a specific preferred embodiment, the air is fed through the hyperboloid agitator bodies 6, 6a, 6b, 9, 9b, 9a, which are preferably formed as hollow bodies.

The proposed wastewater purification apparatuses function as follows:

The rotation of one of the hyperboloid agitator bodies 6, 6a, 6b, 9, 9a, 9b results in a flow that is directed from a surface O of a wastewater W received in the tank 1 along the vertical agitator shaft 5, 8 to an upper side of the hyperboloid agitator body 6, 6a, 6b, 9, 9a, 9b. The flow then deflects parallel to the upper side of the hyperboloid agitator body 6, 6a, 6b, 9, 9a, 9b in a substantially horizontal direction. It then deflects further and is directed again to the upper side O. On the whole, a circulating flow directed from the upper side O to a base F of the tank 1 is created.

As can be seen in particular from FIGS. 2 and 4, flow sections are formed during the operation of adjacent vertical agitators 4, 4a, 4b, 7, 7a, 7b, which flow sections are delimited by the upstream flows resulting between two successive vertical agitators 4, 4a, 4b, 7, 7a, 7b from the base F in the direction of the surface O and the two longitudinal sides L1 and L2 of the tank 1. Only a small exchange of a suspension formed from the wastewater W and an activated sludge occurs between successive flow sections. The exchange or transport of the suspension from the inflow 2 to the decanter 3 may be controlled by one or more of the following parameters:

amount of wastewater W fed through the inflow 2 per unit of time, rotary speed of the first and/or second vertical agitators 4, 4a, 4b, 7, 7a, 7b, amount of the purified wastewater W removed per unit of time by means of the decanter 3.

FIG. 5 shows, by way of example, a plan view of an upper side O1 of the first hyperboloid agitator. First transport ribs 10 extend on the first upper side O1 and run from the first agitator shaft 5 firstly in the radial direction to the peripheral edge U of the first hyperboloid agitator body 6. The first transport ribs 10, following a first curvature, then deflect in a tangential direction towards the peripheral edge U.

FIG. 6 shows a plan view of a further upper side of the second hyperboloid agitator body 7. There, second transport ribs 11 extend from the second agitator shaft 8 again in the radial direction and deflect towards the peripheral edge U in accordance with a second curvature in a tangential direction. The first curvature is opposite the second curvature. Due to the different embodiment of the first transport ribs 10 and the second transport ribs 11, the first hyperboloid agitator body 5 is suitable in particular for a rotation in an anticlockwise direction, whereas the second hyperboloid agitator body 7 is suitable for a rotation in a clockwise direction. A particularly efficient circulating flow from the base F to the surface O may be generated with use of hyperboloid agitator bodies 6, 7.

FIGS. 7 to 11 show an advantageous embodiment of the hyperboloid agitator bodies.

In FIG. 7 a hyperboloid agitator body is mounted on a hollow agitator shaft 12. The hyperboloid agitator body has a central connection portion denoted by reference sign 13. The connection portion 13 has a central aperture 14 for the passage of air.

Reference sign 16 denotes an upper shell, with transport ribs 17 extending from the first upper side O1 thereof. Reference sign 18 denotes a lower shell, with walls 19 extending from the second upper side O2 thereof. Reference sign 20 denotes an insert which is provided downstream of the aperture 14 and an air distribution space 15. The insert 20 is formed in the manner of a conical beaker and has a plurality of air distribution apertures 21 on its peripheral wall. Each of the air distribution apertures 21 leads into an air channel 22 formed by adjacent walls 19 and the upper shell 16 and the lower shell 18. Shearing ribs 23 are mounted on a second underside U2 of the lower shell 18 and on the peripheral edge thereof.

FIG. 8 shows a plan view of the first upper side O1 of the upper shell. The transport ribs 17 extending from the first upper side O1 are visible and run from the aperture 14 firstly in a radial direction and then towards the peripheral edge U in a tangential direction. The insert 20 arranged downstream of the aperture 14 and having the air distribution apertures 21 is also conceivable.

FIG. 9 shows a view from below according to FIG. 8. The transport ribs 17 in the form of indentations are visible on a first underside U1 of the upper shell 16.

FIG. 10 shows a plan view of the second upper side O2 of the lower shell 18. The lower shell 18 is closed in its centre, i.e. opposite the aperture 14 provided in the upper shell 16. The walls 19 extend from the second upper side O2. The walls 19—similarly to the transport ribs 17—run from the centre firstly in a radial direction and then deflect in a substantially tangential direction towards the peripheral edge U. A plurality of retaining devices 24 are situated on the peripheral edge U and form indentations in the second upper side O2. The retaining devices 24 are used—as can be seen in particular in conjunction with FIG. 11 explained below— to receive and fasten the shearing ribs 23.

FIG. 11 shows a view from below according to FIG. 10. The walls 19 are visible in the form of indentations on a second underside U2 of the lower shell. The retaining devices 24, by contrast, extend from the second underside U2. Reference is also made in this regard to FIG. 7. An air outlet opening 25 is provided between each two adjacent retaining devices 24 or two adjacent shearing ribs 23.

FIG. 12 shows a schematic sectional view through a transmission 27 which is connected in terms of drive to a motor 26. The transmission 27 has a hollow transmission shaft 28, the first end of which is connected to an air feed line 29. A fan connected to the air feed line 29 is not shown here. A second end E2 of the hollow transmission shaft 28 is connected to the hollow agitator shaft 12. As can be seen from FIG. 7, a third end E3 of the hollow agitator shaft 12 is connected to the hyperboloid agitator body shown in FIGS. 7 to 11.

The stirring and gassing device resulting in particular from FIGS. 7 to 12 may be mounted for example on a crossbeam or bridge 30 (see FIG. 12) which spans the tank 1 between the two long sides L1 and L2 thereof.

A process for purifying wastewater, in particular an SBR process, can be carried out particularly efficiently with the proposed wastewater purification apparatus.

In order to carry out the process, a predefined amount of activated sludge is added to a wastewater W situated in the tank 1 in the first treatment portion A. The at least one first vertical agitator 4, 4a, 4b is rotated at a predefined first rotary speed, such that a suspension forms from the wastewater W and the activated sludge. At the same time, the at least one second vertical agitator 7, 7a, 7b is rotated at a second rotary speed. The second rotary speed is advantageously quicker than the first rotary speed. Consequently, and in particular due to the opposite rotation directions of the successive vertical agitators, a suspension with a high concentration of activated sludge forms in the first treatment portion A, and a suspension with a lower concentration of activated sludge forms in the second treatment portion B.

During operation of the vertical agitators, the suspension is circulated in accordance with the flow direction shown in FIGS. 2 and 4. In so doing, the suspension is aerated, advantageously simultaneously. Consequently, microorganisms contained in the activated sludge are fed. The microorganisms break down organic impurities in the wastewater.

In the third treatment portion C the suspension rests. The suspension may, however, also be stirred slowly by means of at least one (not shown here) third vertical agitator in the third treatment portion C. There, it usually has an even lower concentration of activated sludge than in the second treatment portion B. In the third treatment portion C a supernatant formed from treated wastewater forms and is removed by means of the decanter 3. During the decanting process, the at least one third vertical agitator is expediently switched off.

The proposed method may advantageously be performed continuously by feeding wastewater constantly through the inflow 2 and discharging a corresponding amount of treated wastewater through the decanter 3.

The proposed method, however, may also be carried out conventionally in the form of an SBR process. To this end the first vertical agitators 4, 4a, 4b and second vertical agitators 7, 7a, 7b are operated only temporarily. During the stoppage times of the vertical agitators 4, 4a, 4b, 7, 7a, 7b, a supernatant formed from treated wastewater forms in the treatment portion C and may then be removed by means of the decanter 3.

LIST OF REFERENCE SIGNS 1 tank
2 inflow
3 decanter
4, 4a, 4b first vertical agitator
5, 5a, 5b first agitator shaft
6, 6a, 6b first hyperboloid agitator body
7, 7a, 7b second vertical agitator
8, 8a, 8b second agitator shaft
9, 9a, 9b second hyperboloid agitator body
10 first transport ribs
11 second transport ribs
12 agitator shaft
13 connection portion
14 aperture
15 air distribution space
16 upper shell
17 transport rib
18 lower shell
19 wall

20 insert
21 air distribution aperture
22 air channel
23 shearing rib
24 retaining device
25 air outlet opening
26 motor
27 transmission
28 hollow transmission shaft
29 air feed line
30 float
A first treatment portion
B second treatment portion
C third treatment portion
E1 first end
E2 second end
E3 third end
F base
L1 first long side
L2 second long side
O surface
O1 first upper side
O2 second upper side
S1 first narrow side
S2 second narrow side
U peripheral edge
U1 first underside
U2 second underside
W wastewater
The invention claimed is:

1. A wastewater purification apparatus for purifying wastewater, comprising:
an undivided elongate tank, on a first narrow side, has an inflow for feeding wastewater,
a first vertical agitator with a first hyperboloid agitator body mounted on a vertical first agitator shaft, wherein the first vertical agitator is configured to form a first treatment portion downstream of the inflow on the first narrow side in the undivided elongate tank,
a second vertical agitator with a second hyperboloid agitator body mounted on a vertical second agitator shaft, wherein the second vertical agitator is configured to form a second treatment portion downstream of the first vertical agitator in the undivided elongate tank,
an aeration device with a fan for aerating wastewater received in the tank,
a first drive device for rotating the first hyperboloid agitator body in a first rotation direction,
a second drive device for rotating the second hyperboloid agitator body in a second rotation direction, which is opposite the first rotation direction, and
a decanter, which is provided for discharging purified wastewater in a third treatment portion on a second narrow side in the undivided elongate tank, which is opposite the first narrow side, wherein the first treatment portion is a zone where a first circulating flow of wastewater is formed by the rotation of the first hyperboloid agitator body of the first vertical agitator in the first rotation direction, wherein a flow circulates axially about the vertical first agitator shaft toward the first hyperboloid agitator body, and the second treatment portion is a zone where a second circulating flow of wastewater is formed by the rotation of the second hyperboloid agitator body of the second vertical agitator in the second rotation direction opposite the first rotation direction, wherein a flow circulates axially about the vertical second agitator shaft toward the second hyperboloid agitator body, wherein the first circulating flow and the second circulating flow circulate in opposite directions.

2. The wastewater purification apparatus according to claim 1, wherein first transport ribs provided on an upper side of the first hyperboloid agitator body have a first curvature, and second transport ribs provided on a further upper side of the second hyperboloid agitator body have a second curvature, which is opposite the first curvature.

3. The wastewater purification apparatus according to claim 1, wherein at least one of the hyperboloid agitator bodies is formed as a hollow body and has a central aperture for feeding air and also has air outlet openings.

4. The wastewater purification apparatus according to claim 3, wherein the agitator shaft is formed as a hollow shaft for feeding air to the central aperture.

5. The wastewater purification apparatus according to claim 4, wherein the drive device has a transmission with a hollow trans-mission shaft, one end of which is connected to the fan and the other end of which is connected to the hollow shaft.

6. The wastewater purification apparatus according to claim 1, wherein the aeration device has at least one perforated air feed line supported on a base of the tank, which air feed line is connected to the fan.

7. The wastewater purification apparatus according to claim 1, wherein a plurality of the first and the second vertical agitators are provided successively in the flow direction, wherein the hyperboloid agitator bodies of directly successive vertical agitators are rotated in each case with opposite rotation directions.

8. A process for purifying wastewater, in particular an SBR process, comprising the following steps:
providing a wastewater purification apparatus according to claim 1, wherein an activated sludge is provided in the first treatment portion and in the second treatment portion,
feeding wastewater through the inflow,
stirring a suspension formed from the wastewater and the activated sludge by means of the first vertical agitator in the first treatment portion, wherein the first hyperboloid agitator body rotates at a predefined first rotary speed in the first rotation direction and the suspension is aerated by means of the aeration device,
stirring the suspension by means of the second vertical agitator, where—in the second hyperboloid agitator body is rotated at a predefined second rotary speed in the second rotation direction and the suspension is aerated by means of the aeration device,
leaving the suspension to rest in the third treatment portion, wherein the suspension is neither stirred nor aerated by means of the aeration device, and
decanting the supernatant by means of the decanter.

9. The process according to claim 8, wherein the first rotary speed is selected to be slower than the second rotary speed.

10. The process according to claim 8, wherein the first rotary speed is selected such that a concentration of activated sludge in a base-side, lower half of the suspension is greater than in the surface-side, upper half.

11. The process according to claim 8, wherein a plurality of first vertical agitators are provided in succession in the flow direction in the first treatment portion and/or a plurality of second vertical agitators are provided in succession in the flow direction in the second treatment portion, wherein the hyperboloid agitator bodies of directly successive vertical agitators are rotated in each case with opposite rotation directions.

12. The process according to claim 8, wherein the wastewater is fed continuously.

13. The process according to claim 8, wherein the wastewater is fed sequentially.

14. The process according to claim 8, wherein the suspension is neither stirred nor aerated by means of the aeration device during the step in which the suspension is left to rest in the second treatment portion and/or third treatment portion.

15. The process according to claim 8, wherein the suspension is neither stirred nor aerated by means of the aeration device during the step in which the suspension is left to rest in the first treatment portion.

* * * * *